United States Patent
Pappas (10) Patent No.: US 6,718,912 B2
(45) Date of Patent: Apr. 13, 2004

(54) PET DRINKING AID DEVICE

(76) Inventor: Nicholas J. Pappas, 32 Sturges Commons, Westport, CT (US) 06880

( * ) Notice: Subject to any disclaimer, the term of this patent is extended or adjusted under 35 U.S.C. 154(b) by 0 days.

(21) Appl. No.: 10/178,606

(22) Filed: Jun. 24, 2002

(65) Prior Publication Data

US 2003/0233985 A1 Dec. 25, 2003

(51) Int. Cl.$^7$ .................................................. A01K 7/00
(52) U.S. Cl. ........................................................ 119/72.5
(58) Field of Search ........................... 119/72.5, 72, 75; 222/110, 111, 546

(56) References Cited

U.S. PATENT DOCUMENTS

| | | | |
|---|---|---|---|
| 2,307,220 A | * 1/1943 | Hewitt | ................ 119/72.5 |
| 2,705,955 A | 4/1955 | Nesset et al. | |
| 2,726,636 A | 12/1955 | Frederiksen | |
| 2,789,717 A | 4/1957 | Demke | |
| 3,529,575 A | 9/1970 | Schalk | |
| 3,566,844 A | 3/1971 | Occhiodori et al. | |
| 3,589,338 A | 6/1971 | Lovitz | |
| 3,752,124 A | 8/1973 | Gabriel | |
| 3,771,496 A | 11/1973 | Atchley | |
| 3,838,664 A | * 10/1974 | Atchley | ................ 119/72.5 |
| 4,132,225 A | 1/1979 | Whattam | |
| 4,637,345 A | * 1/1987 | Hostetler | ................ 119/72.5 |
| 4,787,337 A | 11/1988 | Mayer | |
| 5,301,634 A | 4/1994 | Ho | |
| 5,301,635 A | * 4/1994 | Rovira Badia et al. | .... 119/72.5 |
| 5,327,853 A | * 7/1994 | Hostetler | ................ 119/72.5 |
| 5,363,802 A | 11/1994 | Huff | |
| 5,402,750 A | * 4/1995 | Katz | ................ 119/72.5 |
| 5,447,118 A | 9/1995 | Huff et al. | |
| 5,653,353 A | 8/1997 | Otto et al. | |
| 5,669,329 A | 9/1997 | Krause | |
| 5,816,194 A | 10/1998 | Huff | |
| 5,901,882 A | 5/1999 | Siegel | |
| 6,237,800 B1 | 5/2001 | Barrett | |
| 6,293,226 B1 | 9/2001 | Hwang | |
| 6,553,937 B1 | 4/2003 | Cheng | |
| 2003/0079692 A1 | * 5/2003 | Steudler, Jr. et al. | ...... 119/72.5 |

FOREIGN PATENT DOCUMENTS

FR       755153        11/1933

* cited by examiner

*Primary Examiner*—Yvonne Abbott
(74) *Attorney, Agent, or Firm*—McCarter & English, LLP (57) ABSTRACT

A pet drinking aid includes a cap defining an axial passage therewithin. Preferred embodiments of the cap include securing means for detachably securing the cap to a fluid container and an inwardly directed flange. The securing structure may include helical threads, an elastomeric sleeve or the like. The cap further includes a ball positioned within the axial passage of said cap and, in a preferred embodiment a biasing structure mounted relative to the cap within the axial passage. The biasing structure advantageously engages the ball to bias the ball toward the inwardly directed flange. The ball is preferably captured within the axial passage between the inwardly directed flange and the biasing structure, and the ball is capable of rotatable movement and limited axial movement against the bias of the biasing structure. The biasing structure may include a compression spring, a foam member or the like. In an alternative embodiment, the biasing means is omitted and the cap includes an inwardly directed ridge extending from the cap's inner surface at an axial location intermediate the first and second ends of the cap.

45 Claims, 5 Drawing Sheets

PET DRINKING AID DEVICE

TECHNICAL FIELD

The present disclosure relates to a device for use with a container or vessel containing a fluid, and more particularly to a device for use with a bottle to assist an animal, e.g., a pet, in drinking therefrom.

BACKGROUND OF THE DISCLOSURE

Pet owners involved in providing their pets with recreation encounter a variety of issues. For example, dog owners encounter issues associated with satisfying a dog's thirst when dog and owner are away from the dog's water bowl, e.g., when on a walk or engaged in athletic/recreational activities. It is often inconvenient and/or impractical when not at home to bring along and set up a bowl or some other container from which a pet can drink. While naturally occurring sources of fluid refreshment are sometimes available, e.g., ponds, puddles and the like, more frequently pet owners are left to their own ingenuity in attempting to address their dog's thirst when remote from the home-based water bowl.

Efforts have been devoted in the prior art to developing devices and/or systems for providing fluid refreshment to pets. For example, significant efforts have been expended in providing fluid dispensers for caged pets, such as rabbits, guinea pigs, hamsters and the like. U.S. Pat. No. 3,529,575 to Schalk et al., U.S. Pat. No. 3,771,496 to Atchley, and U.S. Pat. No. 5,363,802 to Huff disclose drinking bottles that may be detachably mounted to a pet's cage. The fluids from the disclosed drinking bottles are introduced into the cage by way of an angled tube that fits through openings defined in the wire cage. Control and/or regulation of fluid flow into the cage is provided by a rotating ball (Atchley '496 patent and Huff '802 patent) or a valve assembly (Schalk '575 patent).

Prior art efforts have also been devoted to developing systems for use by larger pets, e.g., dogs. For example, U.S. Pat. No. 5,301,634 to Ho discloses an animal feeder designed for convenient mounting to a horizontal wire member, the feeder including a ball 60 disposed in a tubular extension 43.

A pet drinking device offering portability to pet owners is disclosed in U.S. Pat. No. 6,293,226 to Hwang. The device of the Hwang '226 patent includes a bottle having a threaded mouth and a cover that engages the threaded mouth. An unsecured gasket is positioned between the cover and the bottle. The cover includes a main body that is internally threaded to engage the mouth of the bottle, and a tube. The tube defines an outwardly threaded portion at an end thereof. An internally threaded sleeve is mounted to the outwardly threaded portion of the tube. An unsecured sealing ring is positioned between the tube and the sleeve. A ball and washer are positioned within the sleeve and a lid is tethered to the cover. A belt is also provided for mounting the Hwang drinking device to a stationary structure, e.g., a hook on a wall.

Despite the prior art efforts referenced hereinabove, a need remains for a drinking aid for use with pets, e.g., dogs, that may be readily utilized with conventional water/beverage bottles and that offers the pet convenient and controlled access to fluid refreshment.

SUMMARY OF THE DISCLOSURE

The present disclosure is directed to a pet drinking aid that provides pets with convenient and controlled access to fluid refreshment, e.g., when away from a home-based water bowl. The disclosed drinking aid overcomes difficulties associated with typical water bottles that deliver uncontrolled fluid flow when fully or partially inverted. The uncontrolled fluid flow provided by such conventional water bottles often finds its way into a pet's windpipe or onto the ground, regardless of the effort and care expended in attempting to address the pet's thirst.

The disclosed pet drinking aid generally includes a cap that is adapted to be detachably mounted to a fluid-containing bottle. The cap may be advantageously threaded onto a fluid-containing bottle. Alternatively, the disclosed cap may include an elastomeric sleeve that facilitates detachably mounting the cap to a bottle, thereby obviating the need for cooperative threads as between the cap and the bottle. The disclosed cap also includes an internal ball that advantageously restricts and/or moderates the flow of fluid from a bottle when positioned at various angles of inversion. The internal ball is typically restrained or captured within the cap by a circumferential flange or rim that advantageously includes an elastomeric, e.g., rubber, washer adjacent and/or in engagement therewith. The washer provides an enhanced fluid seal when a pet is not accessing fluid contained within the container. Thus, for example, the bottle may generally be inverted without fluid leakage due to sealing interaction between the ball and the elastomeric washer, and between the washer and the rim of the cap.

According to preferred embodiments of the present disclosure, the pet drinking aid is fabricated from conventional materials of construction, e.g., plastic(s), rubber(s) and the like. The disclosed pet drinking aid is advantageously sized and dimensioned to be utilized with any standard size fluid bottle, as are known in the art. In addition, the size and dimensions of the disclosed pet drinking aid may be modified, based on the teachings herein, to effectively interact with alternative and/or future fluid containers.

In a first preferred embodiment of the pet drinking aid of the present disclosure, a ball is captured within a cap and is resiliently biased toward the dispensing end of the cap, e.g., by a compression spring. The cap is adapted to be detachably mounted to a fluid-containing bottle, e.g., a conventional water bottle. Preferably, the cap is internally threaded so as to facilitate screwing the cap onto the outwardly threaded neck of the bottle. In an exemplary embodiment of the disclosed pet drinking aid, a ball for regulating fluid flow and an internal plastic spring are positioned within the cap. The plastic spring advantageously supplies a light force against the ball so as to bias the "floating" ball against a lip or flange formed at or near the dispensing end of the cap, thereby capturing the ball therewithin. The diameter of the compression spring is generally slightly less than the diameter of the ball where it contacts the ball, thereby ensuring that the spring maintains engagement with the ball, i.e., the ball is not able to pass through the center of the spring. At the opposite end, the base of the spring typically engages a ridge formed in or defined by the cap, and may be advantageously staked, glued or otherwise mounted to the cap. Alternatively, the base of spring may be positioned between and secured relative to spaced ridges formed in the cap, or positioned between and secured relative to a plurality of spaced, inwardly projecting guides and/or projections formed in the cap. In a preferred embodiment of the present disclosure, the ridge is positioned at or near the midpoint of the cap.

Once the cap is mounted to a fluid-containing bottle according to preferred embodiments of the present disclosure, and the bottle is fully or partially inverted, the motion/pressure supplied to the ball by the pet's tongue, e.g., when licking the bottle/cap, pushes the ball in slightly, i.e., against the bias of the spring positioned therebehind. The movement of the ball relative to the housing of the cap allows fluid within the bottle to flow around the ball. Thus, as the pet licks the ball, the ball assumes a slightly recessed position within the cap and simultaneously spins/rotates, thereby allowing fluid to continuously flow to the pet's mouth. When the pet's licking action ceases, the spring advantageously biases the ball back into sealing engagement with the washer positioned adjacent the rim of the cap, thereby discontinuing the flow of fluid to the pet, regardless of the orientation of the bottle.

According to further preferred embodiments of the present disclosure, small projections/guides or a continuous lip or ridge may be provided on the interior of the cap to more reliably secure the elastomeric washer in position. This structural arrangement advantageously prevents the washer from becoming dislodged and interfering with the ball's desired motion. In exemplary embodiments of the disclosed pet drinking aid, four guides/projections are provided to secure the washer in position. The length of the guides/projections is selected so as to ensure a desired level of security while simultaneously permitting facile assembly of the device. Thus, for example, the guides/projections may be fabricated such that they are about half the thickness of the washer material, and the guides/projections may be circumferentially spaced around the interior of the cap, e.g., one guide/projection located at 0 degrees, one at 90 degrees, one at 180 degrees and one at 270 degrees. Alternatively, according to a further exemplary embodiment of the present disclosure, one continuous lip or ridge may be substituted for individual, spaced guides/projections. According to such alternative embodiment, the lip may be advantageously fabricated such that its thickness is less that the thickness of the washer. The thickness of the securing structure (e.g., guides/projections or lip/ridge) is selected so as not to impede/interfere with the ball sealing against the washer.

Several forces cooperate or interact to control/moderate the flow of fluid from a bottle/cap according to a spring-biased embodiment of the present disclosure. For example, the spring bias and the fluid pressure associated with the inversion (full or partial) of the bottle generally acts against the force of the pet's tongue to determine the degree to which fluid flows from the bottle. Moreover, the speed with which the ball is rotated by the pet's tongue influences the fluid dispensing rate and/or volume. The incremental force supplied by the spring bias advantageously provides a tighter seal to the cap of the present disclosure, particularly in circumstances where the bottle is positioned upright. That is, the spring continuously provides force for the ball to contact the washer at the cap's outer opening, even when the bottle is upright, thereby minimizing or avoiding inadvertent leaking. However, the force of the spring is selected such that it is not so strong as to prevent the pet's drinking motion from pressing the ball slightly inward and moving it in a circuitous motion, thereby allowing fluid to flow to the pet.

According to a further preferred embodiment of the present disclosure, an alternative cap is provided that includes an internal ball captured therewithin and a washer mounted at or adjacent the top of the cap. Unlike the previously described embodiments, however, this further preferred embodiment omits a biasing spring. A ridge is formed on the internal surface of the cap and defines the position where the ball rests when the cap and bottle are upright. Another washer may be optionally provided between the ball and the internal ridge to enhance sealing therebetween. The optional washer is advantageously secured relative to the cap by a plurality of small projections/guides or a continuous lip or ridge, as described with reference to the first washer hereinabove.

Inclusion of the second washer advantageously provides an enhanced seal when the fluid-containing bottle is upright. Generally, the inclusion of the optional washer necessitates slightly greater space for ball movement, so that when the pet is drinking from the bottle and cap, the ball is not pushed so far inward that it is forced into engagement with the additional washer. If insufficient space is provided, smooth rolling of the ball is impeded and fluid flow unacceptably retarded. It is noteworthy, however, that inclusion of an additional washer is generally not necessary or feasible in embodiments that utilize a biasing spring, as described hereinabove, because the ball may be prevented from engaging the second washer by the interposition of the spring.

Pet drinking aids according to the present disclosure are relatively inexpensive to fabricate and provide an efficient, safe and reliable way to provide pets with fluids from a bottle, particularly in instances and places where a bowl or other container is simply not a feasible or convenient choice. Thus, according to the present disclosure, a pet drinking aid is provided that allows users to avoid undesirable situations where the pet may gag or choke on fluids supplied from a typical water bottle. The disclosed pet drinking aid advantageously overcomes the potential for waste and spillage generally associated with fluids provided to pets in portable water bowls and the like. Additional features, benefits and functionalities associated with pet drinking aids according to the present disclosure will be apparent from the detailed description which follows.

BRIEF DESCRIPTION OF THE FIGURES

The features, benefits and functionalities of the present disclosure will become more readily apparent to those skilled in the art from the following detailed description of preferred embodiment(s) when considered together with the accompanying drawings, wherein.

DETAILED DESCRIPTION OF PREFERRED EMBODIMENT(S)

The pet drinking aids of the present disclosure provide pets with convenient and controlled access to fluid refreshment, e.g., when away from a home-based water bowl. As discussed in greater detail below, the disclosed pet drinking aids overcome difficulties associated with typical water bottles that deliver uncontrolled fluid flow when fully or partially inverted. The uncontrolled fluid flow provided by such conventional water bottles often finds its way into a pet's windpipe or onto the ground, regardless of the effort and care expended in attempting to address the pet's thirst. The disclosed pet drinking aids are advantageously sized and dimensioned to be utilized with any standard size fluid bottle, as are known in the art. Adjustments to the size and/or dimensions of the disclosed pet drinking aids may be made to facilitate use with non-conventionally sized fluid bottles, as is apparent from the detailed description provided herein.

Figure 1:
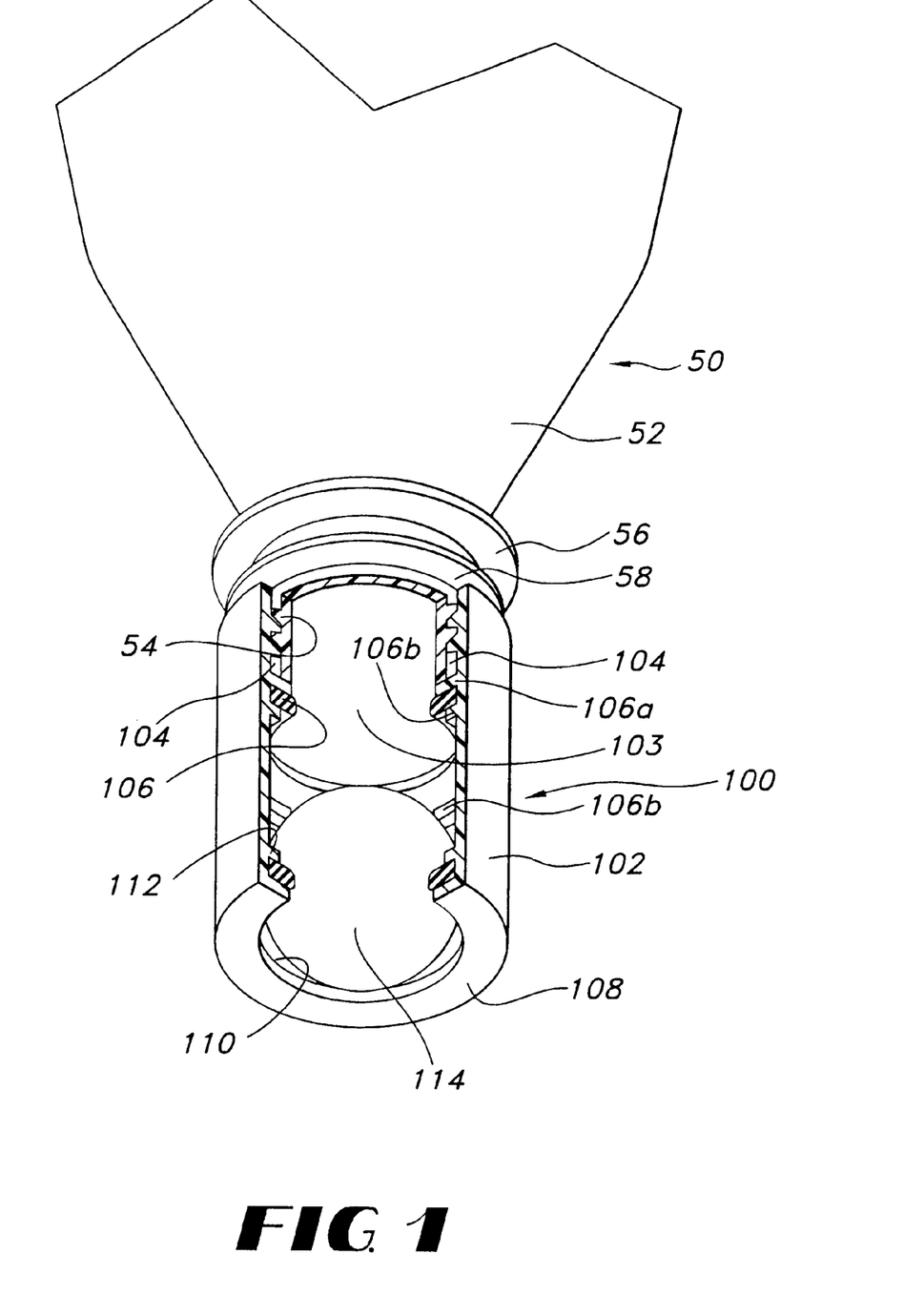
FIG. 1 is perspective side view, partially cut-away, of an exemplary embodiment of a pet drinking aid according to the present disclosure, the pet drinking aid being mounted to a bottle.
Figure 2:
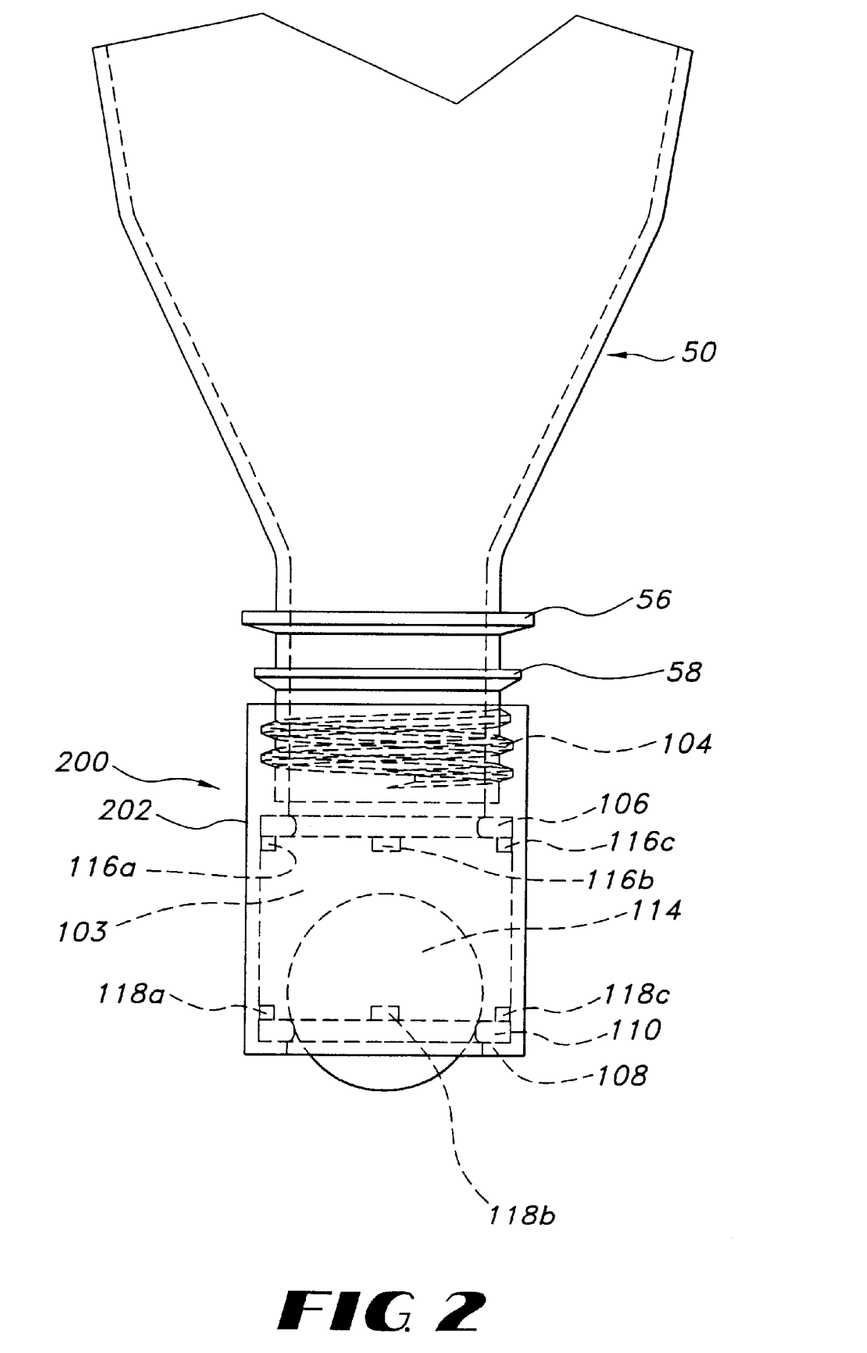
FIG. 2 is a side view, with elements shown in phantom, of the exemplary pet drinking aid and bottle of FIG. 1.

With reference to FIGS. 1 and 2, a first exemplary pet drinking aid 100 according to the present disclosure is depicted in conjunction with a conventional bottle 50. The bottle 50 includes a neck 52 that defines outwardly threaded portion 54. Two spaced, circumferential ridges 56, 58 are also defined on the outside of neck 52. Ridges 56, 58 are conventional in nature, and generally function to provide tamper resistance to bottle 50 through interaction with a conventional cap (not shown), as is known in the art.

Pet drinking aid 100 includes a cylindrical cap 102 that defines an axial passage 103 and inwardly directed threads 104 at a first end thereof. Inwardly directed threads function as exemplary means for detachably securing pet drinking aid 100 to bottle 50 according to the present disclosure. The thread pitch and spacing of inwardly directed threads 104 are generally selected so as to cooperate with conventional drinking fluid containers/bottles, e.g., bottled water and/or soda containers. Cylindrical cap 102 is generally fabricated from conventional plastic materials, as are known in the art.

An inwardly directed, circumferential flange or rim 108 is defined at an opposite end of cap 102. Flange 108 is typically integrally formed with cap 102, although a cooperating flange structure may be joined to cylindrical cap 102, if so desired. Flange 108 provides an abutment surface for positioning a washer 110 within the passage defined by cap 102. Washer 110 provides an enhanced fluid seal when a pet is not accessing fluid contained within the bottle 50, as discussed in greater detail below. Washer 110 is fabricated from conventional elastomeric materials, e.g., rubber, to facilitate the sealing function performed thereby.

A continuous, circumferential lip or ridge 112 is advantageously formed on the interior surface of cap 102 in spaced relation relative to flange 108. Circumferential lip 112 functions in cooperation with flange 108 to more reliably secure washer 110 in position within cap 102. Lip 112 is generally fabricated such that its thickness is less than the thickness of washer 110. The thickness of circumferential lip 112 is selected so as not to impede/interfere with ball 114 (discussed below) sealing against washer 110.

In alternative embodiments of the present disclosure, a plurality of guides and/or projections may be provided in lieu of circumferential lip 112 to reliably secure washer 110 in position. In such alternative embodiments, the length of the guides/projections is selected so as to ensure a desired level of security while simultaneously permitting facile assembly of the device. The thickness of the guides/projections is generally selected so as not to impede/interfere with sealing interaction between washer 110 and ball 114. Thus, for example, the guides/projections may be fabricated such that they are about half the thickness of washer 110, and the guides/projections may be circumferentially spaced around the interior of cap 102, e.g., one guide/projection located at 0 degrees, one at 90 degrees, one at 180 degrees and one at 270 degrees.

A second washer 106 is generally provided at a predefined distance from the first end of cylindrical cap 102, i.e., from washer 110 and flange 108. Second washer 106 is typically secured in place by structural features formed on the inside surface of cap 102, e.g., between first and second securing flanges 106a, 106b. Second washer 106 is fabricated from the same types of materials as washer 110, and may be identical in all respects to washer 110. The spacing between washer 110 and second washer 106 is selected so as to permit movement of ball 114, as discussed herein below. In a preferred embodiment of the present disclosure, second washer 106 is located at a position intermediate the first and second ends of cap 102 and axial passage 103, and in a particularly preferred embodiment, second washer 106 is positioned substantially at or near the midpoint of axial passage 103.

With further reference to FIG. 1, a ball 114 is positioned for movement within axial passage 103. Ball 114 is generally spherical in shape and fabricated from a substantially non-deformable material, e.g., rubber or a hard plastic. Ball 114 is captured within axial passage 103 by washer 110 and second washer 106, i.e., removal of ball 114 from cap 102 is prevented by the diameters of the passages through washer 110 and second washer 106. The diameter of ball 114 is thus characterized in that it is less than the diameter of inner passage 103, but greater than the diameter of the openings formed in washer 110 and second washer 106.

Based on the manner in which ball 114 is captured within axial passage 103, ball 114 is capable of rotatable movement and limited axial movement relative to cap 102. As shown in FIG. 1, bottle 50 and cap 102 are shown fully inverted, such that fluid within bottle 50 flows into axial passage 103 and bears against ball 114. Ball 114 engages washer 110 and forms a seal therewith. Thus, in the absence of movement of ball 114 relative to washer 110, i.e., rotatable and/or axial movement of ball 114, fluid is prevented from exiting axial passage 103 through flange 108. Thus, bottle 50 may be inverted without fluid leakage due to sealing interaction between ball 114 and the washer 110.

With bottle 50 fully or partially inverted, if a pet licks the exposed portion of ball 114, the motion and pressure from the pet's tongue pushes the ball in slightly, i.e., against the downward pressure of the fluid within axial passage 103, and generally causes rotational motion of ball 114 relative to cap 102. The movement of ball 114 (rotational and/or axial) relative to cap 102 allows fluid within the bottle to flow around the ball. Thus, as the pet licks ball 114, the ball assumes a recessed position within axial passage 103 of cap 102 relative to the sealing orientation depicted in FIG. 1, and simultaneously spins/rotates, thereby allowing fluid to continuously flow to the pet's mouth.

When the pet's licking action ceases (and assuming bottle 50 remains in an inverted or slightly inverted orientation), ball 114 returns to its position of sealing engagement with washer 110, e.g., under the continued downward force of fluid contained within axial passage, thereby discontinuing the flow of fluid to the pet. When bottle 50 is rotated to a non-inverted orientation, the downward force on ball 114 supplied by fluid within axial passage 103 (and gravity) is removed. In the absence of such downward force, ball 114 reorients itself within axial passage 103 such that it engages second washer 106. The engagement between ball 114 and second washer 106 functions to substantially "close" bottle 50 when in the non-inverted orientation, thereby preventing significant, undesired fluid dispersal through cap 102.

With reference to FIG. 2, an alternative embodiment of a pet drinking aid 200 is schematically depicted in cross section. Pet drinking aid 200 features many of the same structures and functions as are described herein above with reference to pet drinking aid 100 and, in the interest of clarity, the same numeric designations are employed for structures that are unchanged relative to pet drinking aid 100. Thus, for example, pet drinking aid 200 includes a cylindrical cap 202 that is detachably secured to a bottle 50 through helical threads 104. Cap 202 defines an axial passage 103 and a flange or rim 108 at an end opposite helical threads 104.

Washer 110 is positioned adjacent flange 108 and second washer 106 is positioned intermediate the first and second ends of cap 202. However, unlike cap 102 of pet drinking aid 100, cap 202 includes a plurality of guides or projections 118a, 118b, 118c for securing washer 110 relative to cap 202. Three guides 118a, 118b, 118c are depicted in the cross sectional view of FIG. 2. However, a fourth guide/projection (not pictured) is positioned opposite guide 118b. Thus, according to a preferred embodiment of the present disclosure, guides 118a, 118b, 118c and the unpictured guide are circumferentially spaced around the interior surface of cap 202, i.e., spaced 90° from each other. Thus, a guide is advantageously formed at 0°, 90°, 180° and 270°. The disclosed guides/projections are generally integrally formed with cap 202, i.e., formed in connection with the conventional molding of cap 202.

With further reference to FIG. 2, guides or projections 116a, 116b, 116c are provided in place of securing flange 106b. Guides 116a, 116b, 116c extend inwardly from the inner surface of cap 202 and are preferably integrally formed with cap 202, e.g., during the molding of cap 202. A fourth, non-pictured guide is positioned opposite guide 116b.

The lengths of the guides/projections 116a, 116b, 116c and 118a, 118b, 118c schematically depicted in FIG. 2 are generally selected so as to ensure a desired level of security for washers 106 and 110, respectively, while simultaneously permitting facile assembly of pet drinking aid 200. Thus, for example, the foregoing guides/projections may be advantageously fabricated such that they are about half the thickness of the washer material. In addition, the thickness of the guides/projections is selected so as not to impede/interfere with ball 114 sealing against washers 106, 110.

Figure 3:
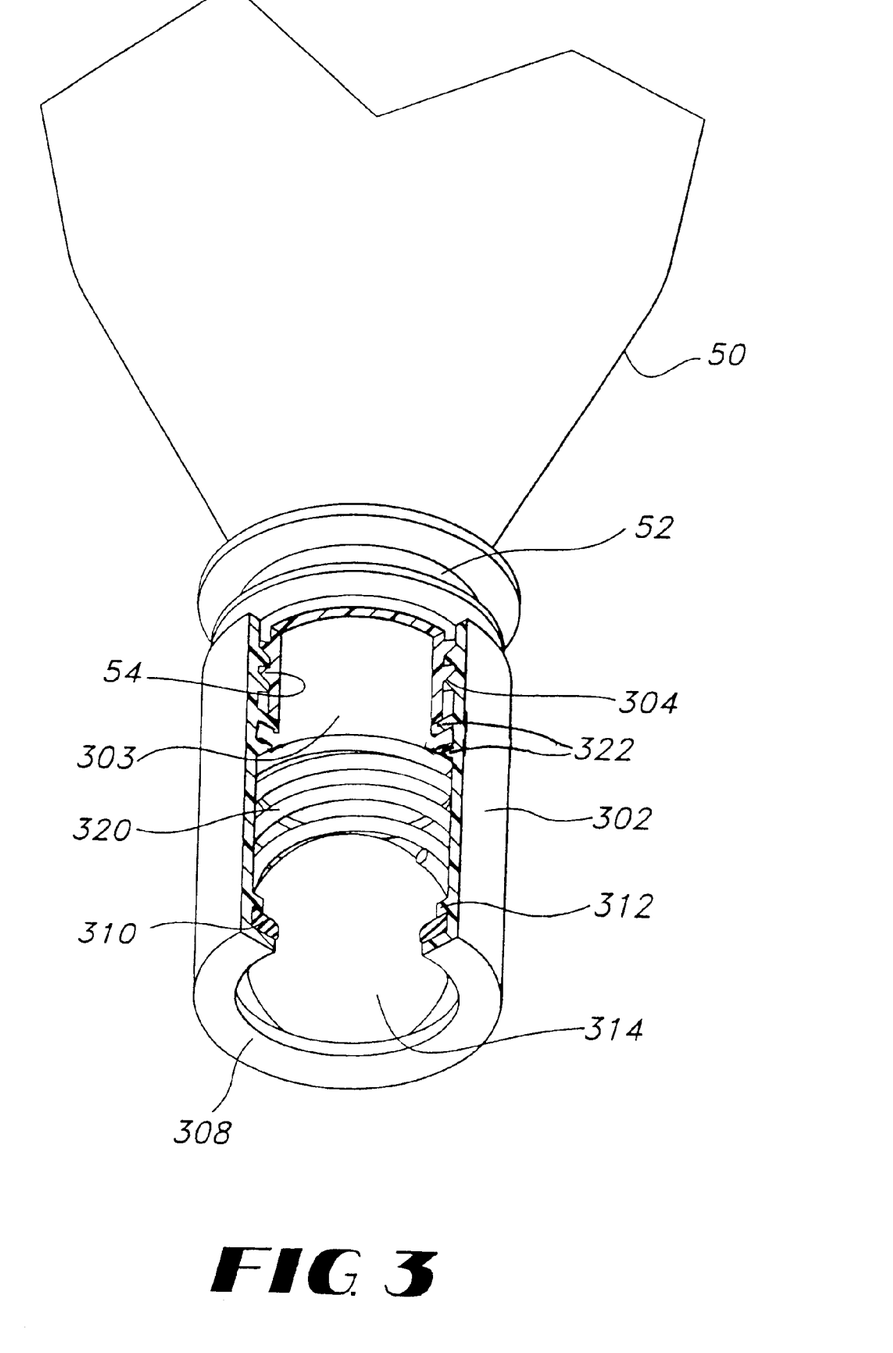
FIG. 3 is perspective side view, partially cut-away, of a second exemplary embodiment of a pet drinking aid according to the present disclosure, the pet drinking aid being mounted to a bottle.
Figure 4:
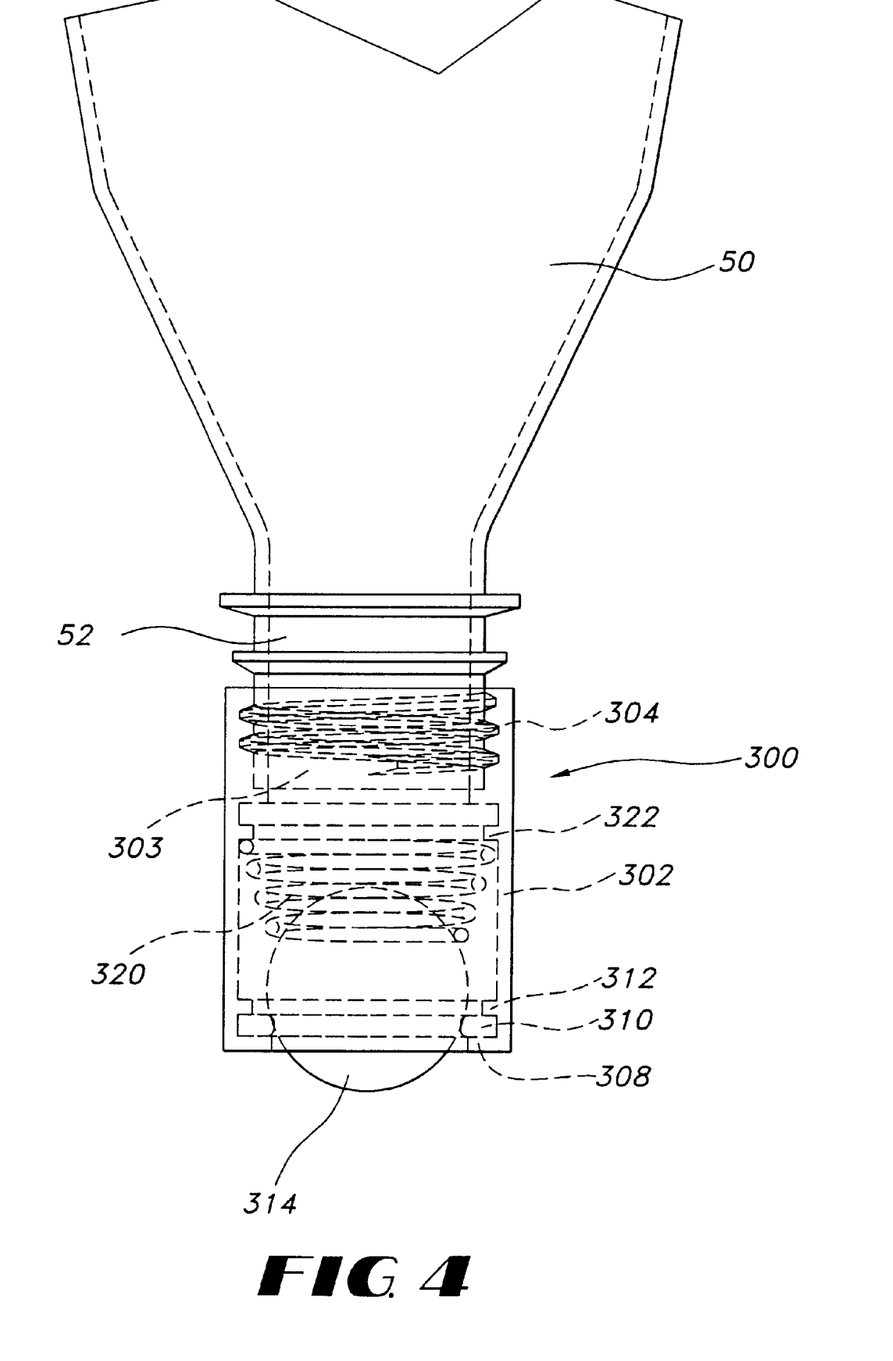
FIG. 4 is a side view, with elements shown in phantom, of the exemplary pet drinking aid and bottle of FIG. 3.

Turning to FIGS. 3 and 4, an alternative exemplary pet drinking aid embodiment of the present disclosure is depicted in which identical reference designations are used to identify structures that correspond to structures discussed with reference to the preceding embodiments. Pet drinking aid 300 is depicted in conjunction with a conventional bottle 50 that includes a neck 52 having outwardly threaded portion 54. Pet drinking aid 300 includes a cylindrical cap 302 that defines an axial passage 303 and inwardly directed threads 304 at a first end thereof. Inwardly directed threads function as exemplary means for detachably securing pet drinking aid 300 to bottle 50 according to the present disclosure. The thread pitch and spacing of inwardly directed threads 304 are generally selected so as to cooperate with conventional drinking fluid containers/bottles, e.g., bottled water and/or soda containers. Cylindrical cap 302 is generally fabricated from conventional plastic materials, as are known in the art.

An inwardly directed, circumferential flange or rim 308 is defined at an opposite end of cap 302. Flange 308 is typically integrally formed with cap 302, although a cooperating flange structure may be joined to cylindrical cap 302, if so desired. Flange 308 provides an abutment surface for positioning a washer 310 within the axial passage 303 defined by cap 302. Washer 310 provides an enhanced fluid seal when a pet is not accessing fluid contained within the bottle 50, as discussed in greater detail below. Washer 310 is fabricated from conventional elastomeric materials, e.g., rubber, to facilitate the sealing function performed thereby. A continuous, circumferential lip or ridge 312 is formed on the interior surface of cap 302 in spaced relation relative to flange 308 which functions in cooperation with flange 308 to more reliably secure washer 310 in position within cap 302. The thickness of circumferential lip 312 is selected so as not to impede/interfere with ball 314 sealing against washer 310.

A ball 314 is positioned for movement within axial passage 303 of cap 302. Ball 314 is generally spherical in shape and fabricated from a substantially non-deformable material, e.g., rubber or a hard plastic. A compression spring 320 is positioned within axial passage 303 and engages, i.e., contacts, ball 314 at one end thereof. At the other end, compression spring 320 is mounted relative to the inner surface of cap 302 with respect to ridge 322. Spring 320 may be staked, glued or otherwise mounted to cap 302, or may be merely captured between a ridge and ball 314. In a preferred embodiment of the present disclosure, the ridge is positioned at or near the midpoint of cap 302. Alternatively, the base of spring 320 may be positioned between and secured relative to spaced ridges 322 formed in cap 302, or positioned between and secured relative to a plurality of spaced, inwardly projecting guides and/or projections formed in the cap. In this latter embodiment, axially spaced sets of inwardly projecting guides and/or projections may be provided, e.g., at the axial locations of ridges 322 of FIG. 4. As will be readily apparent to persons skilled in the art, each of such arrangements constitutes a means of mounting spring 320 relative to cap 302 for purposes of the present disclosure.

Ball 314 is thus captured within axial passage 303 between washer 310 and compression spring 320, and is resiliently biased toward the dispensing end of cap 302. The diameter of compression spring 320 is generally slightly less than the diameter of ball 314 where it contacts the ball, thereby ensuring that spring 320 maintains engagement with ball 314, i.e., the ball is not able to pass through the center of the spring. The removal of ball 314 from cap 302 is prevented by the diameter of the opening formed in washer 310 and the inner diameter of compression spring 320. The diameter of ball 314 is thus characterized in that it is less than the diameter of inner passage 103, but greater than the diameter of the openings formed in washer 310 and compression spring 320.

Compression spring 320 may be fabricated from a variety of materials, e.g., plastic, metal and the like. Alternatively, a hollow, biasing foam member may be substituted for compression spring 320 to bias ball 314 toward the dispensing end of cap 302. A compression spring and hollow, biasing foam member are exemplary biasing means for biasing ball 314 toward inwardly directed flange 308. Of note, with reference to the cap embodiment of FIGS. 3 and 4, with the inclusion of compression spring 320, a washer is generally not included in juxtaposition to spaced ridges 322 (or inwardly projecting guides and/or projections). Nonetheless, it may be desirable to form ridges 322 (or the guides/projections) in cap 302, e.g., if a single mold is fabricated for the manufacture of caps that both include and do not include a compression spring. Moreover, the presence of ridges 322 (or the guides/projections) may facilitate the mounting of compression spring 322 relative to cap 302, as discussed herein above.

Several forces cooperate or interact to control/moderate the flow of fluid from a bottle/cap according to embodiments of the present disclosure that include a biasing means, e.g., a compression spring. For example, the spring bias and the fluid pressure associated with the inversion (full or partial) of the bottle generally acts against the force of the pet's tongue to determine the degree to which fluid flows from the bottle. Moreover, the speed with which the ball is rotated by the pet's tongue influences the fluid dispensing rate and/or volume. The additional force supplied by the spring bias advantageously provides a tighter seal to the cap of the present disclosure, particularly in circumstances where the bottle is positioned upright. That is, the spring continuously provides force for the ball to contact the washer at the cap's outer opening, even when the bottle is upright, thereby minimizing or avoiding inadvertent leaking. However, the force of the spring is selected such that it is not so strong as to prevent the pet's drinking motion from pressing the ball slightly inward and moving it in a circuitous motion, thereby allowing fluid to flow to the pet.

Once cap 302 is mounted to bottle 50 according to preferred embodiments of the present disclosure, and the bottle is fully or partially inverted, the motion/pressure supplied to ball 314 by the pet's tongue, e.g., when licking in the vicinity of flange 308, pushes ball 314 in slightly, i.e., against the bias of compression spring 320 positioned therebehind. The movement of ball 314 relative to cap 302 (rotatable and/or axial) allows fluid within the bottle to flow around the ball. Thus, as the pet licks ball 314, the ball assumes a slightly recessed position within cap 302 and simultaneously spins/rotates, thereby allowing fluid to continuously flow to the pet's mouth. When the pet's licking action ceases, compression spring 320 advantageously biases ball 314 back into sealing engagement with washer 310 positioned adjacent the flange 308, thereby discontinuing the flow of fluid to the pet, regardless of the orientation of bottle 50. When bottle 50 is rotated to a non-inverted orientation, the biasing force applied to ball 314 by compression spring 320 advantageously maintains the ball in sealing engagement with washer 310.

Figure 5:
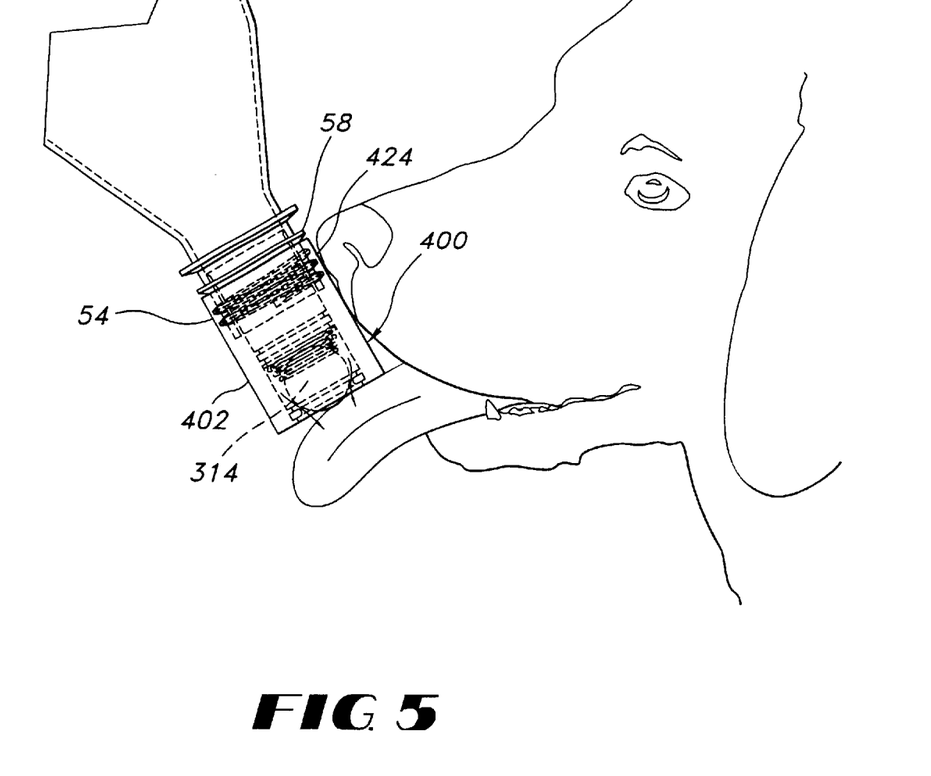
FIG. 5 is a perspective side view of the exemplary pet drinking aid and bottle of FIGS. 3 and 4 in use.

With reference to FIG. 5, a further exemplary embodiment of the pet drinking aid of the present disclosure is depicted. Pet drinking aid 400 is similar in most respects to pet drinking aid 300 described herein above with reference to FIGS. 3 and 4. Thus, pet drinking aid 400 includes a compression spring 320 that biases ball 314 into engagement with washer 310 positioned adjacent flange 308. However, unlike pet drinking aid 300, the cap 402 of pet drinking aid 400 is detachably mounted to bottle 50 by way of an elastomeric sleeve 424 that advantageously fits over and resiliently engages neck 52 of bottle 50. Elastomeric sleeve 424 is secured to the cap 402 through appropriate mounting means, e.g., glue, a cooperative tongue and groove structure, and the like, and facilitates detachably mounting of cap 402 to a bottle, thereby obviating the need for cooperative threads as between the cap and the bottle. Elastomeric sleeve 424 may be fabricated from a host of elastomeric materials, e.g., rubber, elastomeric polymer or similar material as would be apparent to persons skilled in the art. The inner diameter of elastomeric sleeve 424 in its rest, i.e., non-stretched condition, is typically slightly less than the maximum diameter of the neck of the bottle to which it is to be secured. For purposes of diameter selection, the diameter of the bottle's neck is deemed include the threads and/or lip formed on the neck of the bottle. Thus, elastomeric sleeve 424 is sized and configured to stretch over the neck of a bottle and maintain a secure relationship therewith unless and until subsequently removed by the user.

The pet drinking aids of the present disclosure are relatively inexpensive to fabricate and provide an efficient, safe and reliable way to provide pets with fluids from a bottle, particularly in instances and places where a bowl or other container is simply not a feasible or convenient choice. Thus, according to the present disclosure, a pet drinking aid is provided that allows users to avoid undesirable situations where the pet may gag or choke on fluids supplied from a typical water bottle. The disclosed pet drinking aid advantageously overcomes the potential for waste and spillage generally associated with fluids provided to pets in portable water bowls and the like.

Although pet drinking aids of the present disclosure have been described with reference to exemplary embodiments thereof the present disclosure is not to be limited to the specifics of the disclosed embodiments, but is to be broadly understood. For example, it is contemplated that an eyelet and cover may be secured to the cap of the present disclosure, e.g., through interaction with threads formed on the exterior of the cap, thereby permitting users to affirmatively close the open end of the cap (thereby potentially recessing the ball within the cap, e.g., against the bias of the compression spring or against a washer such as washer 106). It is further contemplated that for threaded embodiments of the disclosed pet drinking aids, it may be desirable to include a ridge, flange or stop on the cap at the end of the threads to provide a positive stop in connection with the screwing of the cap onto the bottle. The disclosed embodiments are merely illustrative, and not limitative, of the scope of the present invention, and changes, modifications and/or variations may be utilized without departing from the spirit or scope of the present invention.

What is claimed is:

1. A pet drinking aid, comprising:
   (a) a cap defining an axial passage therewithin, said cap including securing means for detachably securing said cap to a fluid container positioned adjacent a first end of said cap, and further including an inwardly directed flange formed at a second end of said cap;
   (b) a ball positioned within said axial passage of said cap;
   (c) biasing means mounted relative to said cap within said axial passage, said biasing means engaging said ball to bias said ball toward said inwardly directed flange;
   wherein said ball is captured within said axial passage between said inwardly directed flange and said biasing means; and
   wherein said ball is capable of rotatable movement and limited axial movement against the bias of said biasing means; and
   wherein said securing means for detachably securing said cap to a fluid container comprises an elastomeric sleeve extending from said cap, said elastomeric sleeve configured and dimensioned to sealingly engage said fluid container.

2. A pet drinking aid according to claim 1, wherein said ball is formed of a substantially non-deformable material and is substantially spherical in shape.

3. A pet drinking aid according to claim 1, wherein said cap and said axial passage are substantially cylindrical in shape.

4. A pet drinking aid according to claim 1, wherein said biasing means comprises a compression spring.

5. A pet drinking aid according to claim 1, wherein said biasing means has a diameter that is less than the diameter of said ball.

6. A pet drinking aid according to claim 1, further comprising a washer mounted in said axial passage and positioned adjacent to said inwardly directed flange.

7. A pet drinking aid according to claim 1, further comprising an eyelet and cover secured to said cap.

8. A pet drinking aid according to claim 7, wherein said eyelet and cover are secured to said cap through interaction with thread formed on the exterior of the cap.

9. A pet drinking aid, comprising:
(a) a cap defining an axial passage therewithin, said cap including securing means for detachably securing said cap to a fluid container positioned adjacent a first end of said cap, and further including an inwardly directed flange formed at a second end of said cap and an inwardly directed ridge formed on an inner surface of said cap;
(b) a ball positioned within said axial passage of said cap;
(c) biasing means mounted relative to said cap within said axial passage, said biasing means engaging said ball to bias said ball toward said inwardly directed flange, wherein said biasing means comprises a compression spring;
wherein said ball is captured within said axial passage between said inwardly directed flange and said biasing means; and
wherein said ball is capable of rotatable movement and limited axial movement against the bias of said biasing means; and
wherein said compression spring includes a base that is mounted to said ridge.

10. A pet drinking aid according to claim 9, wherein said axial passage defined within said cap includes a middle region, and wherein said inwardly directed ridge is formed in said middle region.

11. A pet drinking aid according to claim 9, further comprising an eyelet and cover secured to said cap.

12. A pet drinking aid according to claim 11, wherein said eyelet and cover are secured to said cap through interaction with thread formed on the exterior of the cap.

13. A pet drinking aid according to claim 9, wherein said biasing means has a diameter that is less than the diameter of said ball.

14. A pet drinking aid according to claim 9, wherein said securing means for detachably securing said cap to a fluid container comprises helical threading formed on said cap, said helical threading configured and dimensioned to cooperate with threads formed on said fluid container.

15. A pet drinking aid, comprising:
(a) a cap defining an axial passage therewithin, said cap including securing means for detachably securing said cap to a fluid container positioned adjacent a first end of said cap, and further including an inwardly directed flange formed at a second end of said cap;
(b) a ball positioned within said axial passage of said cap;
(c) biasing means mounted relative to said cap within said axial passage, said biasing means engaging said ball to bias said ball toward said inwardly directed flange;
wherein said ball is captured within said axial passage between said inwardly directed flange and said biasing means;
wherein said ball is capable of rotatable movement and limited axial movement against the bias of said biasing means; and
wherein said biasing means comprises a hollow foam member.

16. A pet drinking aid according to claim 15, further comprising an eyelet and cover secured to said cap.

17. A pet drinking aid according to claim 16, wherein said eyelet and cover are secured to said cap through interaction with thread formed on the exterior of the cap.

18. A pet drinking aid according to claim 15, wherein said biasing means has a diameter that is less than the diameter of said ball.

19. A pet drinking aid according to claim 15, wherein said securing means for detachably securing said cap to a fluid container comprises helical threading formed on said cap, said helical threading configured and dimensioned to cooperate with threads formed on said fluid container.

20. A pet drinking aid, comprising:
(a) a cap defining an axial passage therewithin, said cap including securing means for detachably securing said cap to a fluid container positioned adjacent a first end of said cap, and further including an inwardly directed flange formed at a second end of said cap and a washer mounted in said axial passage and positioned adjacent to said inwardly directed flange;
(b) a ball positioned within said axial passage of said cap;
(c) biasing means mounted relative to said cap within said axial passage, said biasing means engaging said ball to bias said ball toward said inwardly directed flange;
wherein said ball is captured within said axial passage between said inwardly directed flange and said biasing means;
wherein said ball is capable of rotatable movement and limited axial movement against the bias of said biasing means; and
wherein said washer is captured between said inwardly directed flange and a protruding member formed on an inner surface of said cap.

21. A pet drinking aid according to claim 20, wherein said protruding member is selected from the group consisting of a plurality of spaced projections, a plurality of spaced guides, a continuous circumferential lip, and a continuous circumferential ridge.

22. A pet drinking aid according to claim 20, further comprising an eyelet and cover secured to said cap.

23. A pet drinking aid according to claim 22, wherein said eyelet and cover are secured to said cap through interaction with thread formed on the exterior of the cap.

24. A pet drinking aid according to claim 20, wherein said biasing means has a diameter that is less than the diameter of said ball.

25. A pet drinking aid according to claim 20, wherein said securing means for detachably securing said cap to a fluid container comprises helical threading formed on said cap, said helical threading configured and dimensioned to cooperate with threads formed on said fluid container.

26. A pet drinking aid, comprising:
(a) a cap defining an inner surface and an axial passage therewithin, said cap including: (i) securing means for detachably securing said cap to a fluid container positioned adjacent a first end of said cap, (ii) an inwardly directed flange formed at a second end of said cap, and (iii) an inwardly directed ridge extending from said inner surface at an axial location intermediate said first and second ends;
(b) a first washer positioned adjacent said inwardly directed flange;
(c) a ball positioned within said substantially cylindrical passage; and
(d) a second washer engaging said inwardly directed ridge, said second washer configured and dimensioned to sealingly engage said ball when said cap is in a vertical orientation;
wherein said ball is captured between said first washer and said inwardly directed ridge, and is capable of rotatable movement and limited axial movement relative to said cap.

27. A pet drinking aid according to claim 26, wherein said ball is formed of a substantially non-deformable material and is substantially spherical in shape.

28. A pet drinking aid according to claim 26, wherein said cap and said axial passage are substantially cylindrical in shape.

29. A pet drinking aid according to claim 26, wherein said securing means for detachably securing said cap to a fluid container comprises helical threading formed on said cap, said helical threading configured and dimensioned to cooperate with threads formed on said fluid container.

30. A pet drinking aid according to claim 26, wherein said securing means for detachably securing said cap to a fluid container comprises an elastomeric sleeve extending from said cap, said elastomeric sleeve configured and dimensioned to sealingly engage said fluid container.

31. A pet drinking aid according to claim 26, wherein said first washer is captured between said inwardly directed flange and a protruding member formed on said inner surface of said cap.

32. A pet drinking aid according to claim 31, wherein said protruding member is selected from the group consisting of a plurality of spaced projections, a plurality of spaced guides, a continuous circumferential lip, and a continuous circumferential ridge.

33. A pet drinking aid according to claim 26, further comprising an eyelet and cover secured to said cap.

34. A pet drinking aid according to claim 33, wherein said eyelet and cover are secured to said cap through interaction with thread formed on the exterior of the cap.

35. A pet drinking aid according to claim 26, wherein said biasing means has a diameter that is less than the diameter of said ball.

36. In combination:
(a) a fluid container including an opening for fluid passage; and
(b) a pet drinking aid, wherein said pet drinking aid comprises:
(i) a cap defining an axial passage therewithin, said cap including securing mean in detachable engagement with said fluid container positioned adjacent a first end of said cap, and an inwardly directed flange formed at a second end of said cap;
(ii) a ball positioned within said axial passage of said cap;
(iii) biasing means mounted relative to said cap within said axial passage, said biasing means engaging said ball to bias said ball toward said inwardly directed flange;
wherein said ball is captured within said axial passage between said inwardly directed flange and said biasing means; and
wherein said ball is capable of rotatable movement and limited axial movement against the bias of said biasing means to permit fluid to flow through said opening of said fluid passage opening of said fluid container and past said ball; and
wherein said securing means in detachable engagement with said fluid container comprises an elastomeric sleeve extending from said cap, said elastomeric sleeve configured and dimensioned to sealingly engage said fluid container.

37. A combination according to claim 36, wherein said biasing means has a diameter that is less than the diameter of said ball.

38. In combination:
(a) a fluid container including an opening for fluid passage; and
(b) a pet drinking aid, wherein said pet drinking aid comprises:
(i) a cap defining an axial passage therewithin, said cap including securing means for detachably securing said cap to said fluid container positioned adjacent a first end of said cap, and further including an inwardly directed flange formed at a second end of said cap and an inwardly directed ridge formed on an inner surface of said cap;
(ii) a ball positioned within said axial passage of said cap;
(iii) biasing means mounted relative to said cap within said axial passage, said biasing means engaging said ball to bias said ball toward said inwardly directed flange, wherein said biasing means comprises a compression spring;
wherein said ball is captured within said axial passage between said inwardly directed flange and said biasing means;
wherein said ball is capable of rotatable movement and limited axial movement against the bias of said biasing means; and
wherein said compression spring includes a base that is mounted to said ridge.

39. A combination according to claim 38, wherein said biasing means has a diameter that is less than the diameter of said ball.

40. In combination:
(a) a fluid container including an opening for fluid passage; and
(b) a pet drinking aid, wherein said pet drinking aid comprises:
(i) a cap defining an axial passage therewithin, said cap including securing means for detachably securing said cap to said fluid container positioned adjacent a first end of said cap, and further including an inwardly directed flange formed at a second end of said cap;
(ii) a ball positioned within said axial passage of said cap;
(iii) biasing means mounted relative to said cap within said axial passage, said biasing means engaging said ball to bias said ball toward said inwardly directed flange;
wherein said ball is captured within said axial passage between said inwardly directed flange and said biasing means;
wherein said ball is capable of rotatable movement and limited axial movement against the bias of said biasing means; and
wherein said biasing means comprises a hollow foam member.

41. A combination according to claim 40, wherein said biasing means has a diameter that is less than the diameter of said ball.

42. In combination:
(a) a fluid container including an opening for fluid passage; and
(b) a pet drinking aid, wherein said pet drinking aid comprises:
(i) a cap defining an axial passage therewithin, said cap including securing means for detachably securing said cap to said fluid container positioned adjacent a first end of said cap, and further including an inwardly directed flange formed at a second end of said cap and a washer mounted in said axial passage and positioned adjacent to said inwardly directed flange;

(ii) a ball positioned within said axial passage of said cap;

(iii) biasing means mounted relative to said cap within said axial passage, said biasing means engaging said ball to bias said ball toward said inwardly directed flange;

wherein said ball is captured within said axial passage between said inwardly directed flange and said biasing means;

wherein said ball is capable of rotatable movement and limited axial movement against the bias of said biasing means; and wherein said washer is captured between said inwardly directed flange and a protruding member formed on an inner surface of said cap.

43. A combination according to claim 42, wherein said biasing means has a diameter that is less than the diameter of said ball.

44. In combination:

(a) a fluid container including an opening for fluid passage; and (b) a pet drinking aid, wherein said pet drinking aid comprises:

(i) a cap defining an inner surface and an axial passage therewithin, said cap including: (aa) securing means for detachably securing said cap to said fluid container positioned adjacent a first end of said cap, (bb) an inwardly directed flange formed at a second end of said cap, and (cc) an inwardly directed ridge extending from said inner surface at an axial location intermediate said first and second ends;

(ii) a first washer positioned adjacent said inwardly directed flange;

(iii) a ball positioned within said substantially cylindrical passage; and (iv) a second washer engaging said inwardly directed ridge, said second washer configured and dimensioned to sealingly engage said ball when said cap is in a vertical orientation;

wherein said ball is captured between said first washer and said inwardly directed ridge, and is capable of rotatable movement and limited axial movement relative to said cap.

45. A combination according to claim 44, wherein said biasing means has a diameter that is less than the diameter of said ball.

* * * * *